United States Patent [19]
Palmer et al.

[11] Patent Number: 5,281,388
[45] Date of Patent: Jan. 25, 1994

[54] RESIN IMPREGNATION PROCESS FOR PRODUCING A RESIN-FIBER COMPOSITE

[75] Inventors: Raymond J. Palmer, Newport Beach, Calif.; William E. Moore, Newark, Ohio

[73] Assignee: McDonnell Douglas Corporation, Long Beach, Calif.

[21] Appl. No.: 854,858

[22] Filed: Mar. 20, 1992

[51] Int. Cl.$^5$ ............................................. B29C 43/12
[52] U.S. Cl. .................................. 264/571; 264/257; 264/316
[58] Field of Search ............... 264/314, 316, 510, 511, 264/257, 258, 553, 571, 102, 328.2; 425/389, 405.1, 543

[56] References Cited

U.S. PATENT DOCUMENTS

| | | | |
|---|---|---|---|
| H,559 | 12/1988 | Brown | 264/510 |
| 3,334,383 | 8/1967 | Irvine | 425/389 |
| 4,132,755 | 1/1979 | Johnson | 425/389 |
| 4,311,661 | 1/1982 | Palmer | 264/510 |
| 4,312,829 | 1/1982 | Fourcher | 425/389 |
| 4,816,106 | 3/1989 | Turris et al. | 264/510 |
| 4,849,147 | 7/1989 | Freeman | 264/314 |
| 4,902,215 | 2/1990 | Seemann, III | 425/405.1 |
| 4,942,013 | 7/1990 | Palmer et al. | 264/511 |
| 4,946,640 | 8/1990 | Nathoo | 264/510 |
| 5,041,260 | 8/1991 | Johnson et al. | 264/257 |
| 5,087,193 | 2/1992 | Herbert, Jr. | 425/405.1 |
| 5,134,002 | 7/1992 | Vallier | 425/389 |
| 5,152,949 | 10/1992 | Leoni et al. | 264/257 |

FOREIGN PATENT DOCUMENTS

| | | | |
|---|---|---|---|
| 54-38384 | 3/1979 | Japan | 264/257 |
| 1316840 | 6/1987 | U.S.S.R. | 264/257 |
| 2222980A | 3/1990 | United Kingdom | 425/405.1 |

*Primary Examiner*—Jay H. Woo
*Assistant Examiner*—Robert B. Davis
*Attorney, Agent, or Firm*—Max Geldin

[57] ABSTRACT

Process for vacuum impregnation of a dry fiber reinforcement with a curable resin to produce a resin-fiber composite, by drawing a vacuum to permit flow of curable liquid resin into and through a fiber reinforcement to impregnate same and curing the resin-impregnated fiber reinforcement at a sufficient temperature and pressure to effect final curing. Both vacuum and positive pressure, e.g. autoclave pressure, are applied to the dry fiber reinforcement prior to application of heat and prior to any resin flow to compact the dry fiber reinforcement, and produce a resin-fiber composite of reduced weight, thickness and resin content, and improved mechanical properties. Preferably both a vacuum and positive pressure, e.g. autoclave pressure, are also applied during final curing.

12 Claims, 1 Drawing Sheet

RESIN IMPREGNATION PROCESS FOR PRODUCING A RESIN-FIBER COMPOSITE

The invention described herein was made in the performance of work under NASA Contract No. NAS1-18862 and is subject to the provisions of Section 305 of the National Aeronautics and Space Act of 1958 (42 U.S.C. 2457).

BACKGROUND OF THE INVENTION

This invention relates to a process for producing resin impregnated fiber reinforced materials, and is particularly concerned with improved procedure for impregnating dry fiber reinforcement, e.g. carbon or graphite cloth, with a predetermined amount of resin, followed by final curing, to produce a resin impregnated reinforcement material having improved mechanical properties, while having reduced thickness and reduced resin content.

Most structural type composite parts, particularly those made for the aerospace industry, are fabricated from "B" stage resin impregnated woven cloth or tape fibers such as graphite. The resin is partially cured or "staged" to the desired consistency for tack and handling characteristics that will allow a later heat and pressure cycle to complete the fabrication process. This material is cut and laid up ply by ply, placed under a vacuum bag and the assembly is then placed in an autoclave and cured by heat and pressure to form the final "C" stage cured laminate.

The concept of impregnating dry fibrous materials such as woven cloth with a resin under vacuum conditions alone, followed by curing, does not compact the dry fiber preform sufficiently and produces a correspondingly heavy, thick high resin content lower strength product.

Illustrative of the prior art are U.S. Pat. No. 4,311,661, to R. J. Palmer and U.S. Pat. No. 4,942,013, to R. J. Palmer et al.

In U.S. Pat. No. 4,311,661 there is disclosed a vacuum resin impregnation process wherein vacuum pressure only is used to resin impregnate the fiber reinforcement layer and after impregnation, autoclave pressure and heat are applied for curing. The result is a resin-fiber composite which while compacted to some degree during curing under autoclave pressure, still retains a high resin content and such autoclave pressure does not reduce the thickness of the composite to the desired level.

U.S. Pat. No. 4,942,013 discloses a vacuum resin impregnation process, wherein a liquid resin/catalyst system is impregnated into a dry fiber reinforcement under vacuum pressure alone, and final curing of the resin takes place under vacuum pressure. Here also, the dry fiber preform is densified under vacuum alone to produce a relatively thick heavy composite of relatively high resin content, resulting in a composite having lower strength than desired.

Accordingly, it is an object of the present invention to provide an improved resin impregnation process for impregnating dry fiber reinforcement material, so as to produce a fiber resin composite having improved mechanical properties.

Another object is the provision of a process for resin impregnation of a fiber reinforcement so as to result in a cured composite of reduced thickness, and reduced weight and resin content.

Yet another object is the provision of an efficient process for fabrication of a resin-fiber composite by uniformly impregnating a fiber reinforcement material with a resin under conditions to reduce the thickness and resin content of the cured composite, and improving the mechanical properties thereof.

Other objects and advantages of the invention will appear hereinafter.

SUMMARY OF THE INVENTION

It has now been found that if both vacuum and positive pressure, e.g. autoclave or press pressure, are applied to the dry fiber reinforcement prior to any resin impregnation, e.g. in either of the above patent processes, a high quality fiber-resin composite is produced having reduced thickness and reduced resin content and having improved mechanical properties, particularly compression and tensile strength and modulus.

It has been found that the properties of the resin-fiber composite can be further improved and thickness and resin content of the resulting composite further reduced by application of both a vaccum and positive pressure such as autoclave or press pressure, during final curing.

Thus, as applied to the process of U.S. Pat. No. 4,311,661, a dry fiber reinforcement layer is placed over a curable resin film, and a vacuum and autoclave pressure are applied to the assembly before any heat is applied. This compacts the dry preform to a desired thickness, prior to any resin flow. Then heat is applied to cause resin impregnation of the fiber reinforcement layer and curing. Such curing can take place under vacuum and also under autoclave or press pressure to develop a resin impregnated fiber composite having improved mechanical properties as well as reduced thickness and resin content according to the invention.

As applied to the process of U.S. Pat. No. 4,942,013 employing a liquid resin for fiber reinforcement impregnation, the dry preform is compacted and densified under both vacuum and autoclave or press pressure prior to releasing flow of the resin with heat, for impregnation of the fiber reinforcement. Improved mechanical properties of the resulting resin-fiber composite are achieved by curing the resin impregnated fiber reinforcement also under both vacuum and positive pressure, that is, autoclave or press pressure.

Thus, application of the concept of the present invention to the process of each of the above patents results in an efficient low cost improved process for fabrication of a resin-fiber composite of reduced weight, thickness and resin content, and improved mechanical properties at least equal to a "B" stage tape 100 psi autoclave cured panel.

According to the invention concept, by initially compressing the fiber reinforcement layer using for example autoclave or press pressure, prior to resin impregnation, the result is a composite having the same number of fibers but less resin binding the fibers. Since there is a reduced amount of resin in the compressed fiber reinforcement layer, for a given stress, there is a saving in weight of the cured resin impregnated fiber reinforcement.

BRIEF DESCRIPTION OF THE DRAWINGS

The invention will be more clearly understood by reference to the description below taken in conjunction with the accompanying drawings wherein.

DESCRIPTION OF PREFERRED EMBODIMENTS OF THE INVENTION

It is noted according to the invention that the positive pressure applied to the fiber reinforcement to compress same prior to resin impregnation, can be autoclave or press pressure, e.g. ranging from about 50 to about 150 psi. Such positive pressure is also preferably applied during curing of the resin following fiber reinforcement impregnation, to enhance the properties of the final resin-fiber composite.

Curing temperatures of the curable resins employed herein can range from about 200° to about 350° F., depending upon the specific resin employed, except in those cases where a liquid resin/catalyst system is employed, wherein curing temperatures can be lower, e.g. from about room temperature (70° F.) to about 350° F.

Figure 1:
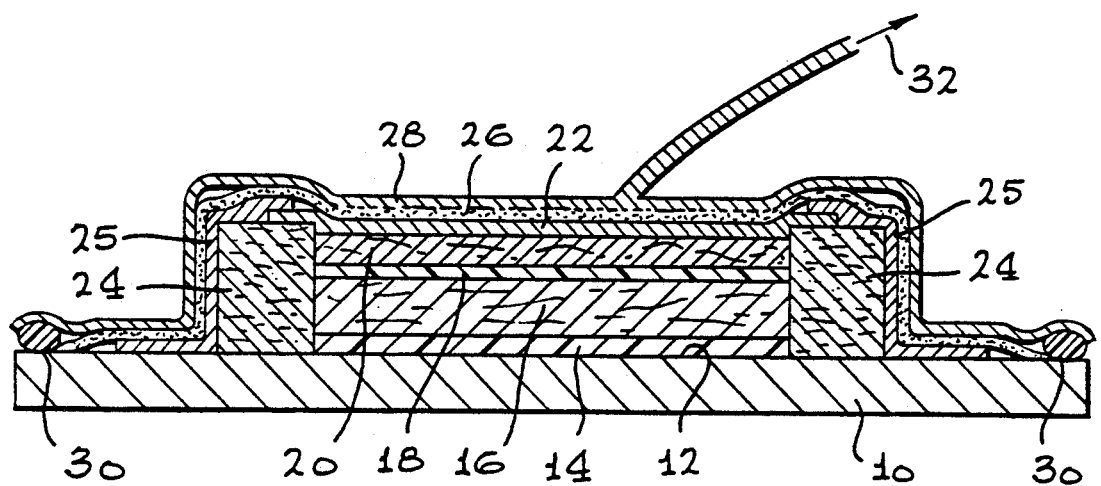
FIG. 1 illustrates a system for carrying out the invention process employing a "B" stage resin film for impregnating a dry fiber reinforcement layer.

Referring to FIG. 1 of the drawing, numeral 10 represents the base of a tool or mold for impregnating a fiber reinforcement with a resin according to the invention. A coating of a mold release material such as silicone or Teflon emulsion (Freekote 33) is first applied to the mold surface 12. A partially cured, that is "B" stage, resin film 14 of predetermined thickness, e.g. ranging from about 0.005" to about 0.25 inch thick is applied over the mold release material, and can be made up of a number of plies to give the desired resin content to the final laminate product. For this purpose, various thermosetting resins, preferably "hot melt" epoxy "B" stage resins with high flow characteristics when heated and prior to cure can be employed in the process. Other thermosetting resins or polymers having similar "B" stage properties when heated can also be employed, such as polyesters, polyimides, both condensation and addition types and phenolic resins. In the present embodiment of a "hot melt" epoxy B-stage resin is employed.

A dry fiber reinforcement layer 16 is then applied over the "B" stage resin film. Such fibrous reinforcement can be in the form of fibers, woven cloth, mat, stitched material, tow, yarn, tape, and the like. Such fiber reinforcement can be made up of several layers and have a thickness of about 0.005 to over 1 inch. The fiber reinforcement can be comprised of various materials such as glass fiber, carbon, graphite, boron, aramide, such as the material marketed as Kevlar, and the like. In the present embodiment plies of carbon cloth having a total thickness of about 0.40 inch is employed.

A permeable parting film 18 is applied over the dry fiber reinforcement 16. Such parting film functions to permit liquid resin to flow or pass through the film, and such parting film can be separated from the adjacent fiber reinforcement layer after the curing cycle is completed. For this purpose, various materials can be employed, such as Teflon, tedlar, the latter two materials being fluorinated hydrocarbons. A porous Teflon-coated glass fiber cloth is a specific example of a suitable permeable parting film.

Over the parting film 18 is applied a bleeder material 20. The bleeder material can be any non-reacting absorbent material such as glass fiber cloth, polyester paper and other nonreactive absorbent materials. The bleeder can be in the form of several layers. Such bleeder material can range from about 0.005 to about 0.1 inch thick, and the amount of bleeder utilized is calculated to absorb a desired amount of resin.

Edge dams 24 are placed around this lay-up arrangement to retain and restrict flow of resin during the resin cure cycle.

A non-porous seal film 22 is next applied over the bleeder material 20 and edge dams 24. For this purpose, nylon or other non-porous film is used to trap the resin in the fiber reinforcement 16 and the bleeder material 20. A masking tape 25 is used to attach the seal film 22 of the edge dams 24, such tape 25 being attached to the tool surface 12.

A breather cloth layer 26 is placed over the non-porous seal film 22 and over the edge dams 24 to prevent vacuum block off of the outer vacuum bag. Such breather material can be comprised of glass fiber cloth, polyester paper and the like.

A vacuum bag 28 is then placed over the entire lay-up, and the edges of the vacuum bag are sealed as at 30 to the surface 10 of the tool. A vacuum hose 32 is connected to the bag 28 to draw a vacuum within the interior of the lay-up. The entire tool and assembly is placed within an autoclave (not shown).

A vacuum is first drawn through vacuum hose 32, to draw all of the air out of the fiber reinforcement layer 16, and also out of the bleeder material layer 20.

Then 100 psi autoclave pressure is applied, which compacts the dry fiber reinforcement layer to the desired thickness. Then heat is applied to the assembly sufficient to raise the temperature so as to cause the resin film at 14, e.g. in the form of a "B" stage resin, to convert from a solid to a low viscosity liquid. As a result of the heat and application of a vacuum and autoclave pressure, the resin in liquid form will then permeate through the fiber reinforcement 16, through the permeable parting film 18 and into the bleeder material 20. The resin first saturates the fiber reinforcement 16 and the excess resin flows through the permeable parting film 18 into the bleeder 20, saturating the bleeder.

The time required for saturation of the fiber reinforcement is relatively short, e.g. of the order of about 2 to about 10 minutes, dependent on temperature, resin viscosity, and thickness of the fiber reinforcement.

After impregnation, the cure cycle can be completed at the proper curing temperatures for the particular resin. Thus, for example, using a hot melt epoxy, curing temperatures can range from about 250° F. (for 8 hours curing time) to 350° F. (for 2 hours curing time). During the cure cycle, the vacuum and autoclave pressure of 100 psi are maintained.

The resulting resin-fiber composite has a reduced thickness of 0.325", a resin content of 32% by weight and a compressive strength of 85,000 psi.

The basic process described above is disclosed in above U.S. Pat. No. 4,311,661.

Figure 2:
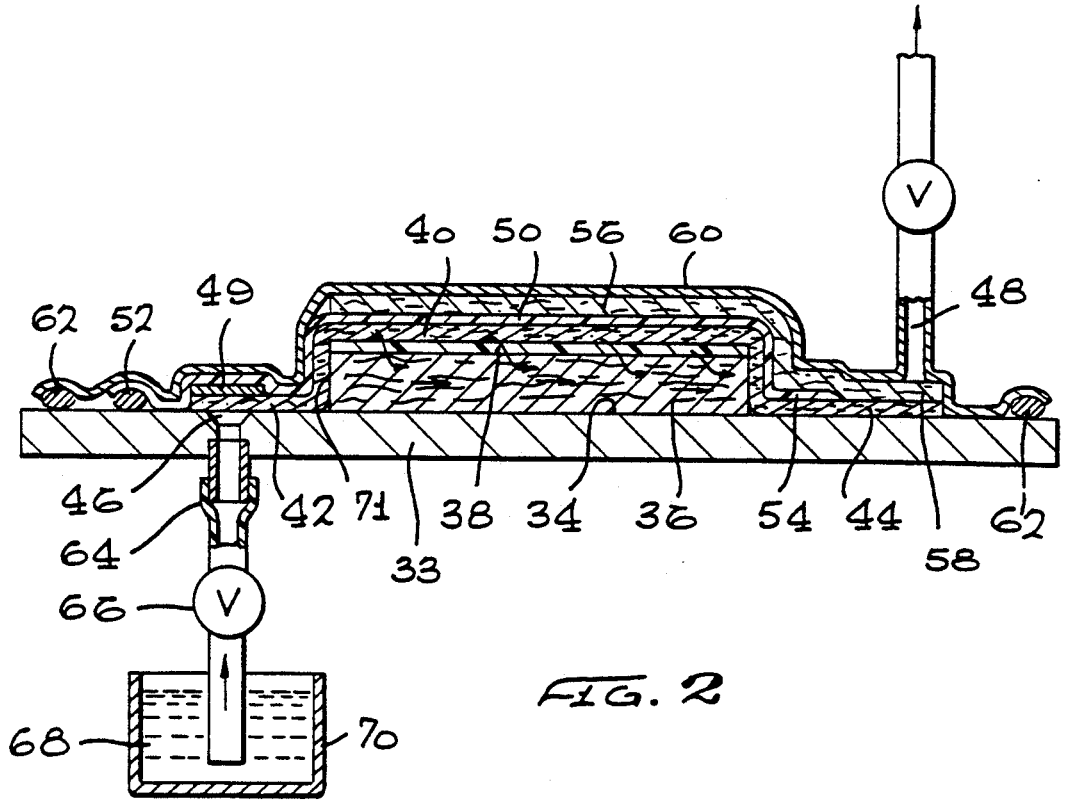
FIG. 2 illustrates another system for carrying out the invention process employing a liquid resin system for impregnating a dry fiber reinforcement.

Referring to FIG. 2 of the drawings, numeral 33 represents the base of a tool or mold for impregnating a dry fiber reinforcement with a resin according to the invention. A coating of a mold release material, such as silicone can be first applied to the tool surface 34. A dry fiber reinforcement layer or layup 36 is then applied over the coated mold surface. In the present embodiment as in the embodiment of FIG. 1, plies of carbon cloth having a total thickness of about 0.40" is employed.

A permeable or porous parting film 38 is applied over the dry fiber reinforcement 36. Over the parting film 38 is applied a bleeder material 40 such as glass fiber cloth. The bleeder material functions as a flow path for passage of liquid resin into and through the porous parting film 38 and into the fiber reinforcement material 36. The bleeder cloth 40 extends over and beyond opposite ends of the fiber reinforcement material 36, and the outwardly extending ends 42 and 44 of the bleeder cloth rest on the mold surface 34. As described in greater detail below, the bleeder, e.g. fiberglass cloth, extension or band 42, positioned across the liquid resin inlet 46, and the bleeder cloth, e.g. fiberglass, extension or band 44 placed adjacent the vacuum outlet 48 function as a resin bleed path from the resin inlet line to the fiber reinforcement 36 and from the fiber reinforcement 36 to the vacuum outlet line 48. A rigid cover 49 is applied over the outwardly extending end 42 of the bleeder cloth and over the resin inlet 46 to prevent the bleeder cloth from filling in the inlet trough 46 and partially blocking the flow of resin.

A non-porous separator or seal film 50 is next applied over the bleeder material 40. For this purpose, nylon or other non-porous film is used to trap the resin in the fiber reinforcement 36 and the bleeder material 40. The non-porous separator film 50 extends over the outwardly extending band 42 of the bleeder cloth and over the cover 49, adjacent the resin inlet 46 and is attached to the tool surface 34 by a seal 52. The opposite end 54 of the non-porous separator 50 extends over and terminates above the rear band 44 of bleeder material 40 adjacent the vacuum outlet 48.

A breather cloth layer 56 is placed over the non-porous separator film 50 and extends over and makes communication with the exposed bleeder extension or fiberglass band 44 below vacuum outlet 48, as indicated at 58.

A vacuum bag 60 is then placed over the entire assembly and the edges of the vacuum bag are sealed as at 62 to the surface 34 of the tool. The vacuum outlet hose 48 is connected adjacent to the area 58 of the breather cloth 56 at the rear end of the assembly opposite the resin inlet end 46. The entire tool and assembly is placed within an autoclave (not shown).

A resin inlet hose 64 containing a valve 66 is connected between a resin container 70 and beneath the vacuum blanket directly to the resin inlet 46 under the bleeder band, e.g. fiberglass, 42, at the resin inlet edge of the panel.

A liquid resin 68 is placed in the container 70 for impregnating the fiber reinforcement 36. For this purpose, various resin systems can be employed including epoxy, epoxy novolacs, and other thermosetting resins, such as polyesters, polyimides, both condensation and addition types, phenolic resins, and bismaleimides. An exemplary liquid resin system which can be employed and which is supplied by the Ciba-Geigy Company is as follows:

| COMPOSITION A | |
|---|---|
| 938 Epoxy Resin | 100 parts |
| 906 Hardener | 117 parts |
| Y-064 Accelerator | 1 part |

With the resin inlet valve 66 closed, a vacuum is drawn through vacuum hose 48 to draw all of the air out of the fiber reinforcement layer 36 and also out of the bleeder layer 40. Also, autoclave pressure of 100 psi is applied to the assembly to densify and compact the fiber reinforcement layer 36.

Then the fiber reinforcement 36 is impregnated with resin by opening the resin inlet valve 66, and with the pull of the vacuum, the resin in container 70 moves to the bleeder band 42 adjacent the inlet end of the layup 36 and is initially distributed throughout the bleeder band 42 transversely across the full width of the fiber reinforcement 36 adjacent to the front edge 71 thereof. The resin will then flow quickly along and through the sacrificial fiberglass bleeder cloth 40, will penetrate the porous parting film 38 below and impregnate the fiber reinforcement 36 by flowing essentially longitudinally therein, as indicated by the arrows.

Prior to drawing vacuum pressure on the layup, the tool is heated, as desired, to control resin viscosity and gel time.

Resin impregnation does not cease immediately when the layup 36 is saturated. After the resin inlet valve 66 is closed, there will still be some resin movement from the saturated layup 36 into the adjacent fiberglass bleeder extension 44 at the far end of the layup.

After completion of impregnation of the fiber reinforcement 36, with liquid resin, the resin inlet valve 66 is closed, and the cure cycle is completed under both vacuum pressure and 100 psi autoclave pressure, and with time and temperature appropriate for the particular resin system.

The resulting resin-fiber composite has a thickness, resin content and compressive strength similar to the resin-fiber composite produced in the previous embodiment carried out with the system of FIG. 1 above.

A comparison was made between the properties of a resin-fiber composite produced (1) according to the invention process set forth above in relation to FIG. 1 of the drawing, utilizing a film resin and employing a vacuum and autoclave 100 psi pressure prior to resin impregnation, and a vacuum and 100 psi autoclave pressure during cure, (2) according to the process described in above U.S. Pat. No. 4,311,661, employing a film resin and vacuum impregnation of resin and then autoclave 100 psi cure, and (3) according to the liquid resin process disclosed in FIG. 1 of above U.S. Pat. No. 4,942,013, employing only vacuum resin impregnation and vacuum cure. In each case the same carbon cloth reinforcement material was employed having the same dry fibers thickness of 0.04", and the resin employed was the same epoxy resin.

The comparative results employing the above three methods is shown in the table below:

TABLE

| | (1) | (2) | (3) |
|---|---|---|---|
| Compression Strength (psi) | 85000 | 75000 | 65000 |
| Thickness (in) | 0.325 | 0.350 | 0.375 |
| % Resin - Weight | 32 | 36 | 40 |
| Process | Vacuum/100 psi Autoclave Impregnation and Vacuum/ Autoclave 100 psi Cure (Film Resin) Invention Process | Vacuum Impregnation and Autoclave 100 psi Cure (Film Resin) Prior Art | Vacuum Impregnation and Vacuum Cure (Liquid Resin) Prior Art |

From the above table it is seen that the above thickness of the resulting resin-fiber composite, 0.325 inch, and the resin content of 32% by weight, produced by the improved process (1) of the present invention, are substantially lower than for the resin-fiber composites of the two prior art processes (2) and (3), and the compressive strength of 85000 psi for the resin-composite produced according to the process (1) of the present invention is substantially higher than the compressive strength of the resin-fiber composites produced according to the two prior art processes (2) and (3).

From the foregoing, it is seen that the process of the present invention employing positive pressure, e.g. in the form of autoclave pressure, prior to resin impregnation, for compaction of the fiber reinforcement, and also preferably during resin cure, results in an improved resin-fiber composite with respect to reduced thickness, resin content and weight, and improved mechanical properties, and the procedure is simple and of relatively low cost.

Since various changes and modifications of the invention will occur to those skilled in the art within the spirit of the invention, the invention is not to be taken as limited except by the scope of the appended claims.

What is claimed is:

1. A process for producing a resin-fiber composite which comprises placing a curable thermosetting resin film on the surface of a tool, applying a dry fiber reinforcement layer over said resin film, applying a vacuum bag over the resulting assembly, placing the resulting vacuum bagged assembly in an autoclave, drawing a vacuum through said assembly, applying pressure in said autoclave to compress the dry fiber reinforcement layer, heating said assembly while under said vacuum and autoclave pressure to cause the resin to flow and to impregnate said fiber reinforcement layer, and further heating said assembly while under said vacuum and said pressure in said autoclave to effect final curing of the resin impregnated fiber reinforcement and to form a resin-fiber composite.

2. The process of claim 1, said autoclave pressure ranging from about 50 to about 150 psi.

3. The process of claim 1, said autoclave pressure being about 100 psi.

4. The process of claim 1, including the steps of placing a porous parting film over said reinforcement layer, applying a bleeder layer over said reinforcement layer, applying a non-porous film over said bleeder layer, and positioning a breather cloth over said non-porous film.

5. The process of claim 1, said resin selected from the group consisting of epoxy, polyester, polyimide and phenolic resins, said fiber reinforcement being selected from the group consisting of glass fiber, carbon, graphite, boron and aramide, in the form of fibers, cloth or mat.

6. The process of claim 1, said curable resin film being a "B" stage epoxy film, said reinforcement layer being graphite cloth.

7. The process of claim 6, said heating carried out at temperature ranging from about 200° to about 350° F.

8. A process for producing a resin-fiber composite which comprises applying a dry fiber reinforcement layer on a tool positioning a bleeder layer on said fiber reinforcement layer, said bleeder layer providing a resin flow path, applying a vacuum bag over the resulting assembly, providing a source of liquid resin communicating with said bleeder layer placing the resulting vacuum bagged assembly in an autoclave, applying pressure in said autoclave to compress the dry fiber reinforcement layer, drawing a vacuum through the assembly of fiber reinforcement layer and bleeder layer to permit passage of the liquid resin, flowing said resin through said bleeder layer and through said fiber reinforcement layer to impregnate same, and curing the resin impregnated fiber reinforcement while maintaining said pressure in said autoclave to form a resin impregnated fiber composite.

9. The process of claim 8, said autoclave pressure ranging from about 50 to about 150 psi.

10. The process of claim 8, said curing taking place by heating said assembly while maintaining same under said vacuum.

11. The process of claim 10, said autoclave pressure being about 100 psi.

12. The process of claim 8, including the steps of placing a porous parting film over said fiber reinforcement layer, positioning a bleeder layer over said porous film, said bleeder layer providing a resin flow path, applying a non-porous seal film over said bleeder layer, and applying a breather layer over said non-porous seal film, said vacuum bag being applied over the entire assembly.

* * * * *